United States Patent
Bostick et al.

(10) Patent No.: US 10,040,352 B2
(45) Date of Patent: Aug. 7, 2018

(54) VEHICLE STEERING CONTROL DISPLAY DEVICE

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 15/096,662

(22) Filed: Apr. 12, 2016

(65) Prior Publication Data

US 2017/0291493 A1   Oct. 12, 2017

(51) Int. Cl.
*B60K 35/00* (2006.01)
*B60Q 9/00* (2006.01)
*B62D 1/04* (2006.01)

(52) U.S. Cl.
CPC ........... *B60K 35/00* (2013.01); *B60Q 9/00* (2013.01); *B62D 1/04* (2013.01); *B60K 2350/928* (2013.01)

(58) Field of Classification Search
None
See application file for complete search history.

(56) References Cited

U.S. PATENT DOCUMENTS

| 5,680,099 A | 10/1997 | Springston |
| 5,691,695 A * | 11/1997 | Lahiff ............... B60K 37/02 340/439 |
| 7,605,693 B2 * | 10/2009 | Kulas ............... B60K 35/00 340/438 |
| 8,587,541 B2 | 11/2013 | Ciesla et al. |

(Continued)

FOREIGN PATENT DOCUMENTS

| DE | 834651 C | 3/1952 |
| GB | 702284 A | 1/1954 |
| WO | 2014058087 A | 4/2014 |

OTHER PUBLICATIONS

Johnston, Casey, "Microfluidics panel could add physical buttons to a touch screen", Ars technica, Jan. 23, 2014 2:30pm EST, 3 pages, <http://arstechnica.com/gadgets/2014/01/new-microfluidics-panel-could-add-physical-buttons-to-a-touch-screen/>.

(Continued)

*Primary Examiner* — Thomas G Black
*Assistant Examiner* — Demetra R Smith-Stewart
(74) *Attorney, Agent, or Firm* — William H. Hartwell (57) ABSTRACT

In one embodiment, a system for a vehicle control display device is provided. The system includes a vehicle steering wheel having spokes connected to a steering shaft, the wheel positioned in front of a dashboard having controls mounted therein. The system further includes a flexible display attached to the wheel or a spoke. The system further includes a sensor installed in the wheel to detect a driver's hand position on the wheel. The system further includes an (Continued)

overhead camera and micro cameras installed in the wheel to determine the driver's eye position. The system further includes a processor attached to the flexible display, the sensor, and the cameras to determine which controls are obscured by the wheel and the spokes and for displaying pre-specified ones of the obscured controls on the flexible display.

17 Claims, 8 Drawing Sheets

(56) References Cited

U.S. PATENT DOCUMENTS

| | | | |
|---|---|---|---|
| 9,120,379 B2 | 9/2015 | Wunsche | |
| 9,552,148 B2* | 1/2017 | Kim | B62D 1/046 |
| 9,626,072 B2* | 4/2017 | Feit | G06F 3/04817 |
| 2012/0268665 A1* | 10/2012 | Yetukuri | B60K 35/00 |
| | | | 348/837 |
| 2015/0084764 A1 | 3/2015 | Wunsche | |
| 2016/0089980 A1* | 3/2016 | Kurahashi | G06F 3/013 |
| | | | 345/156 |
| 2016/0375770 A1* | 12/2016 | Ryne | B60K 35/00 |
| | | | 701/23 |

OTHER PUBLICATIONS

Spear, Zach, "Apple files patent for camera hidden behind display", Apple Insider, Thursday, Jan. 8, 2009, 12:00 pm PT (03:00 pm ET), 14 pages, <http://appleinsider.com/articles/09/01/08apple_files_patent_for_camera_hidden_behind_display.html>.

Walker et al., "Beneath the Surface", enabling technology, Information Display 3/10, © SID 2010, pp. 32-34.

"A touchscreen with keys that rise and disappear", CNN, Updated 11:10 AM ET, Wed Jun. 6, 2012, © 2016 Cable News Network, Inc. A Time Warner Company, 2 pages, <http://www.cnn.com/2012/06/06/tech/a-touchscreen-with-keys-that-rise-and-disappear/index.html>.

"Depth map", From Wikipedia, the free encyclopedia, last modified on Nov. 21, 2014, at 12:39, 2 pages, <https://en.wikipedia.org/wiki/Depth_map>.

"Image texture", From Wikipedia, the free encyclopedia, last modified on Dec. 21, 2015, at 05:56, 3 pages, <https://en.wikipedia.org/wiki/Image_texture>.

* cited by examiner

VEHICLE STEERING CONTROL DISPLAY DEVICE

BACKGROUND

The present invention relates generally to the field of dashboard controls, and more particularly to displaying dashboard controls without obstruction.

In a vehicle, a dashboard, also referred to as a dash, instrument panel, instrument cluster, or fascia, is a control panel placed in front of the driver, behind a steering wheel, housing controls (including instrumentation and user-engageable controls) for operation of the vehicle. In addition to displaying basic information provided by the speedometer, tachometer, odometer and/or fuel gauge, the instrument clusters of modern vehicles are far more complex and may feature gauges and tell-tales such as turn indicators, gearshift position, seat belt warning light, parking-brake-engagement warning light and an engine-malfunction light. The instrument panel may also include indicators for low fuel, low oil pressure, low tire pressure and faults in the airbag supplemental restraint system (SRS) system. Heating and ventilation controls and vents, lighting controls, audio equipment, and automotive navigation systems may also be mounted on the dashboard.

A steering wheel, also referred to as a driving wheel or a hand wheel, is a type of steering control that is used in most modern land vehicles, including all mass-production automobiles, as well as buses, light and heavy trucks, and tractors. The steering wheel is the part of the steering system that is manipulated by the driver and responds to driver inputs.

A flexible display is a display that is flexible in nature; differentiable from the more prevalent traditional flat screen displays used in most electronics devices.

SUMMARY

In one embodiment, a system includes a vehicle steering wheel having spokes connected to a steering shaft, the wheel positioned in front of a dashboard having controls mounted therein. The system further includes a flexible display attached to the wheel or a spoke. The system further includes a sensor installed in the wheel to detect a driver's hand position on the wheel. The system further includes an overhead camera and micro cameras installed in the wheel to determine the driver's eye position. The system further includes a processor attached to the flexible display, the sensor, and the cameras to determine which controls are obscured by the wheel and the spokes and for displaying pre-specified ones of the obscured controls on the flexible display.

In another embodiment, a computer-implemented method includes detecting a driver's hand position on a vehicle steering wheel, the steering wheel positioned in front of a dashboard having controls mounted therein. The computer-implemented method further includes determining the driver's eye position using one or more cameras. The computer-implemented method further includes determining an obstructed dashboard control, wherein a view of the obstructed dashboard control to the driver is obstructed, based, at least in part, on the driver's hand position and the driver's eye position. The computer-implemented method further includes displaying the obstructed dashboard control on a flexible display attached to the steering wheel.

In another embodiment, a computer program product includes one or more computer readable storage media and program instructions stored on the one or more computer readable storage media. The stored computer program product includes program instructions to detect a driver's hand position on a vehicle steering wheel, the steering wheel positioned in front of a dashboard having controls mounted therein. The stored computer program product further includes program instructions to determine the driver's eye position using one or more cameras. The stored computer program product further includes program instructions to determining an obstructed dashboard control, wherein a view of the obstructed dashboard control to the driver is obstructed, based, at least in part, on the driver's hand position and the driver's eye position. The stored computer program product further includes program instructions to display the obstructed dashboard control on a flexible display attached to the steering wheel.

DETAILED DESCRIPTION

Embodiments in accordance with the present invention recognize that dashboard controls can be obstructed at times, by the steering wheel, when operating a vehicle. Many times when operating a vehicle, a user must remove a hand from the steering wheel to select other controls on the steering wheel, or on the console. At the same time, the steering wheel creates an obstacle to the user to view portions of the vehicle dashboard depending on the position of the user. A user may attempt to adjust the height of the steering wheel, or height of a seat to overcome the obstruction, but the wheel may still obstruct some users' view of the controls.

Embodiments of the present invention provide a method for a vehicle to detect an obstruction of specific dashboard control(s) to a user, and display the obstructed control(s) on a flexible display steering wheel. Some embodiments of the present invention also provide a method for the vehicle to detect presence of obstruction of specific dashboard controls of the user, and make the steering wheel display transparent to allow the user to see the dashboard controls. Some embodiments of the present invention also provide a vehicle steering wheel that includes a transparent microfluidics layer for touch sensation that the user can customize or map haptic feedback (e.g. leather feel, quick pulse for ice detected, etc.).

Figure 1:
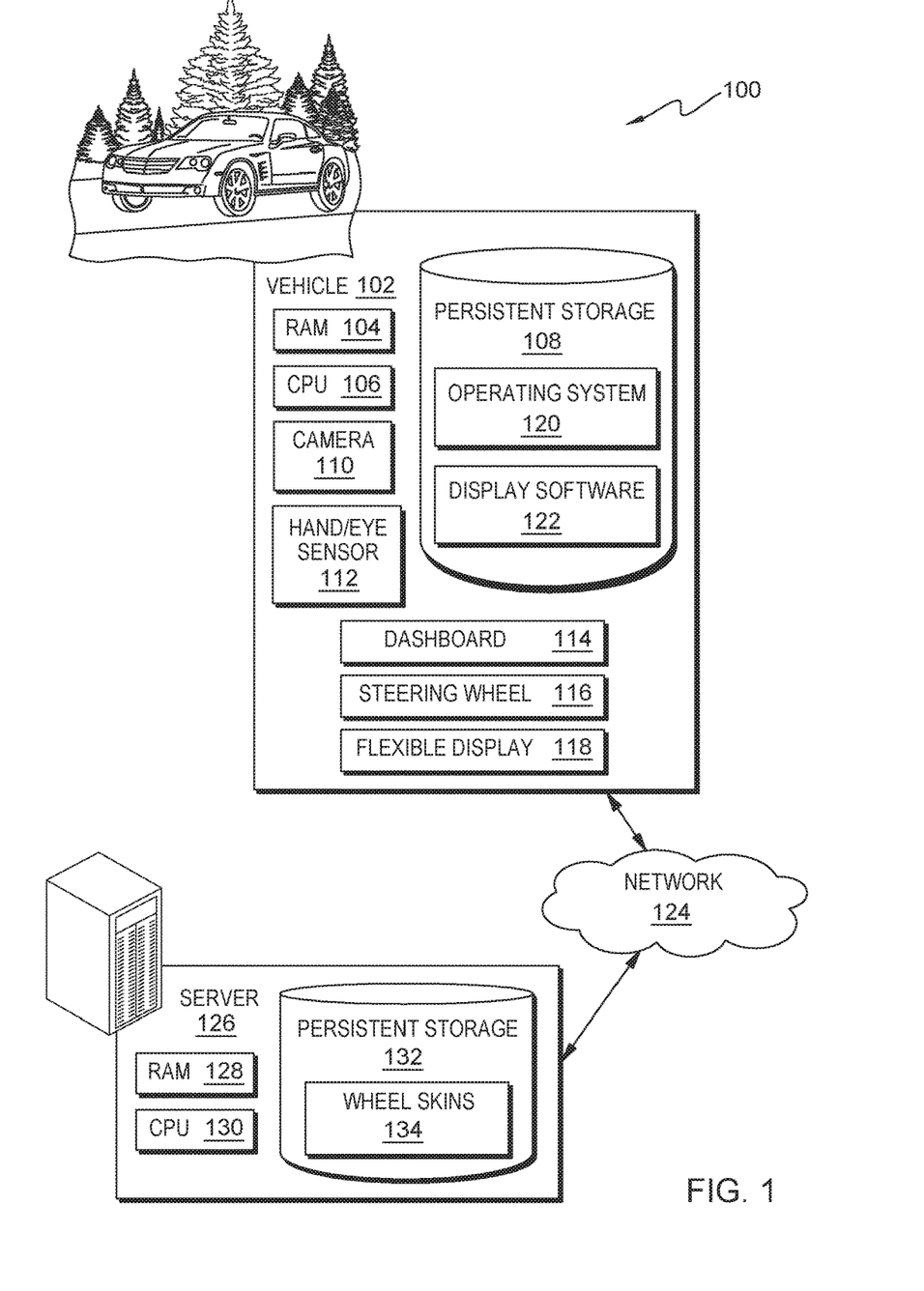
FIG. 1 is a functional block diagram illustrating a vehicle operating environment, in an embodiment in accordance with the present invention.

Embodiments in accordance with the present invention will now be described in detail with reference to the Figures. FIG. 1 is a functional block diagram, generally designated 100, illustrating a vehicle operating environment, in an embodiment in accordance with the present invention.

Vehicle operating environment 100 includes vehicle 102, server 126, and other computing devices (not shown), all interconnected over network 124. Vehicle 102 includes random access memory (RAM) 104, central processing unit (CPU) 106, and persistent storage 108. Vehicle 102 may contain a Web server, or any other electronic device or computing system, capable of processing program instructions and receiving and sending data. In some embodiments, vehicle 102 may include a laptop computer, a tablet computer, a netbook computer, a personal computer (PC), a desktop computer, a personal digital assistant (PDA), a smart phone, or any programmable electronic device capable of communicating over a data connection to network 124. In other embodiments, vehicle 102 may utilize multiple server computing systems comprised of multiple computers as a server system, such as in a distributed computing environment. In general, vehicle 102 is representative of any electronic device or combinations of electronic devices capable of executing machine-readable program instructions and communicating with server 126 via network 124 and with various components and devices (not shown) within vehicle operating environment 100.

Vehicle 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Display software 122 is a computer program, or set of computer programs, that is stored in persistent storage 108, that enables vehicle 102 to display obstructed dashboard controls on steering wheel 116. For example, steering wheel 116 is made transparent by a transparency feature that allows a driver to view the obstructed dashboard controls of the dashboard through flexible display 118. Persistent storage 108 also includes operating system 120 that allows vehicle 102 to communicate with server 126 and other computing devices (not shown) of vehicle operating environment 100 over a data connection on network 124. In other example embodiments, display software 122 may be a component of operating system 120.

Vehicle 102 includes one or more cameras 110 that are installed inside steering wheel 116 that continuously view and capture images of specific controls on dashboard 114 (for a definition of "control," see the DEFINITIONS subsection, below). For example, one or more cameras 110 may be evenly spaced around steering wheel 116 in view of dashboard 114 to provide a continuous view of dashboard 114 as steering wheel 116 is turned by a user, also referred to as a driver, of vehicle 102. However, in other example embodiments, where controls on dashboard 114 can be determined in other ways, cameras 110 may not be necessary. For example, dashboard 114 may be a digital display where the controls displayed on dashboard 114 are determined via software. In this case, display software 122 may request one or more preselected controls and/or gauges via software, for display on flexible display 118.

Vehicle 102 includes one or more hand/eye sensors 112, also referred to as hand/eye trackers, that are installed in dashboard 114, steering wheel 116, and/or elsewhere in vehicle 102 to track the position of a user's hand positions on steering wheel 116 and the user's eyes on one or more controls of dashboard 114. Eye tracking is the process of measuring either the point of gaze (i.e., where a user is looking) or the motion of an eye relative to the head. An eye tracker is a device for measuring eye positions and eye movement. For example, one or more hand/eye sensors 112 installed in dashboard 114 and steering wheel 116 (not shown) may track a user's hand position as steering wheel 116 is being rotated and determines that dashboard 114 is obstructed based on the user's current eye position (e.g., at the current time, the user's eyes are fixed on the area of dashboard 114 that contain the speedometer and/or tachometer).

Vehicle 102 includes dashboard 114 that contains one or more gauges that display basic information provided by the speedometer, tachometer, odometer and fuel gauge. Dashboard 114 may also contain gauges and tell-tales such as turn indicators, gearshift position, seat belt warning light, parking-brake-engagement warning light and an engine-malfunction light. Dashboard 114 may also include indicators for low fuel, low oil pressure, low tire pressure, faults in the airbag supplemental restraint system (SRS) system, or any other information that may be beneficial to the user of vehicle 102.

Vehicle 102 includes steering wheel 116 that may contain one or more cameras 110, one or more hand/eye sensors 112, and flexible display 118. Steering wheel 116 is a circular wheel having one or more spokes connected to a steering shaft, wherein steering wheel 116 is positioned in front of dashboard 114 and may contain one or more controls operated by a user of vehicle 102. In one example embodiment, steering wheel 116 may contain a touch enabled flexible display that allows a user of vehicle 102 to activate or deactivate features within vehicle 102. Such features may include, but are not limited to: (i) an automatic speed control feature, (ii) a volume control for a radio, (iii) a horn, and (iv) a mobile phone call answering, also referred to as "hands free," feature.

Flexible display 118 in contained in steering wheel 116 and is used to display one or more obstructed displays (e.g., the speedometer, fuel gauge, information center, etc.) to the user on steering wheel 116. In one example embodiment, flexible display 118 may be comprised of one or more flexible displays 118 and a plurality of manual, or non-digital, controls that allows a user of vehicle 102 to activate or deactivate features within vehicle 102. For example, the one or more flexible displays 118 may be placed, or wrapped, around steering wheel 116, or have openings for steering wheel 116 controls to be accessible by a user of vehicle 102. In other example embodiments, a portion of flexible display 118 is segmented, hinged and/or retractable to permit the deployment of an airbag SRS from within steering wheel 116.

Figure 8:
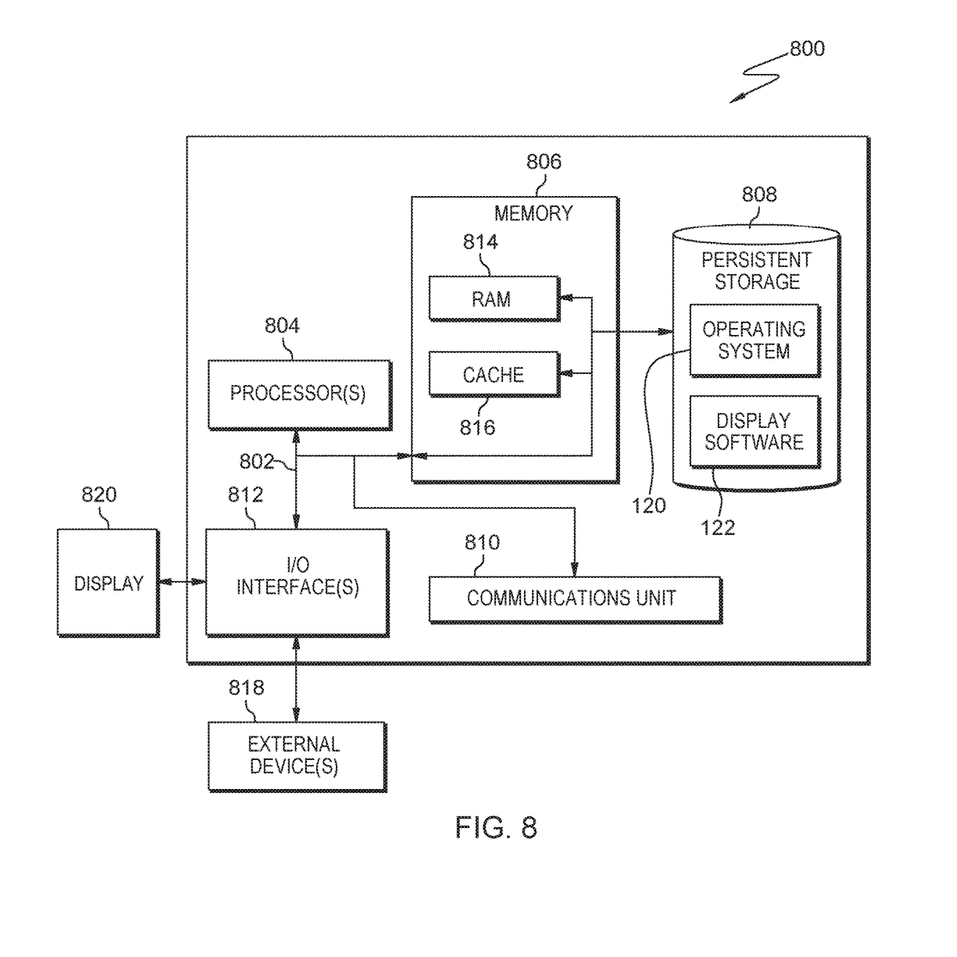
FIG. 8 depicts a block diagram of components of the vehicle executing the display software, in an embodiment in accordance with the present invention.

Vehicle 102 may include internal and external hardware components, as depicted and described in further detail with respect to FIG. 8.

In FIG. 1, network 124 is shown as the interconnecting fabric between vehicle 102, server 126, and with various components and devices (not shown) within vehicle operating environment 100. In practice, the connection may be any viable data transport network, such as, for example, a LAN or WAN. Network 124 can be for example, a local area network (LAN), a wide area network (WAN) such as the Internet, or a combination of the two, and include wired, wireless, or fiber optic connections. In general, network 124 can be any combination of connections and protocols that will support communications between vehicle 102, server 126, and with various components and devices (not shown) within vehicle operating environment 100.

Server 126 is included in vehicle operating environment 100. Server 126 includes random access memory (RAM) 128, central processing unit (CPU) 130, and persistent storage 132. Server 126 may be a Web server, or any other electronic device or computing system, capable of processing program instructions and receiving and sending data. In some embodiments, server 126 may be an on-board computer of vehicle 102 (connected to vehicle 102 either directly or via network 124), a laptop computer, a tablet computer, a netbook computer, a personal computer (PC), a desktop computer, a personal digital assistant (PDA), a smart phone, or any programmable electronic device capable of communicating over a data connection to network 124. In other embodiments, server 126 may represent server computing systems utilizing multiple computers as a server system, such as in a distributed computing environment. In general, server 126 is representative of any electronic devices or combinations of electronic devices capable of executing machine-readable program instructions and communicating with a plurality of vehicle 102's via network 124 and with various components and devices (not shown) within vehicle operating environment 100.

Server 126 includes persistent storage 132. Persistent storage 132 may, for example, be a hard disk drive. Alternatively, or in addition to a magnetic hard disk drive, persistent storage 132 may include a solid state hard drive, a semiconductor storage device, read-only memory (ROM), erasable programmable read-only memory (EPROM), flash memory, or any other computer-readable storage medium that is capable of storing program instructions or digital information. Wheel skins 134 are stored in persistent storage 132, which also includes operating system software, as well as software that enables server 126 to detect and establish a connection to vehicle 102, and communicate with other computing devices (not shown) of vehicle operating environment 100 over a data connection on network 124. Wheel skins 134 are used by display software 122 to provide customizable "skins" to enable a user of vehicle 102 to select a desired look for steering wheel 116. For example, a user may select a wheel skins 134 that makes steering wheel 116 look like the steering wheel of a sports car.

Figure 2:
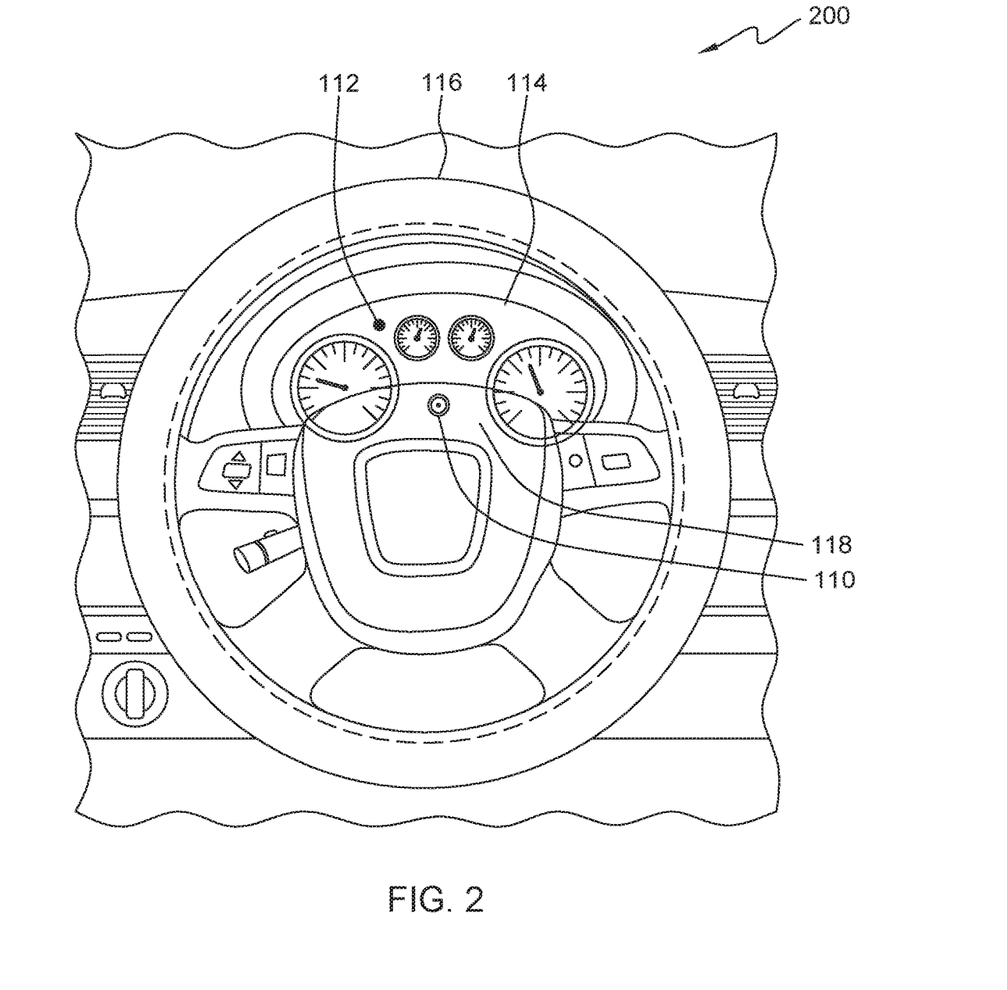
FIG. 2 is a diagram illustrating a display software, on a vehicle within the vehicle operating environment of FIG. 1, for displaying obstructed dashboard controls on a flexible display, in an embodiment in accordance with the present invention.

FIG. 2 is a diagram, generally designated 200, illustrating a display software, on a vehicle within the vehicle operating environment of FIG. 1, for displaying obstructed dashboard controls on a flexible display, in an embodiment in accordance with the present invention. In an example embodiment, the surface of steering wheel 116 is comprised of flexible display 118. Steering wheel 116 is equipped with one or more cameras 110 to continuously view dashboard 114 as steering wheel 116 is rotated by a user. Hand/eye sensor 112 is installed in dashboard 114 to track the hand positions on steering wheel 116 and the user's eye position on dashboard 114. In one example embodiment, flexible display 118 is a touch display that can track the user's hands on steering wheel 116. In another example embodiment, one or more overhead cameras (e.g., camera 110) and one or more micro cameras in steering wheel 116 detect the user's eye position to determine the obstruction of specific controls based on position of user.

Figure 3:
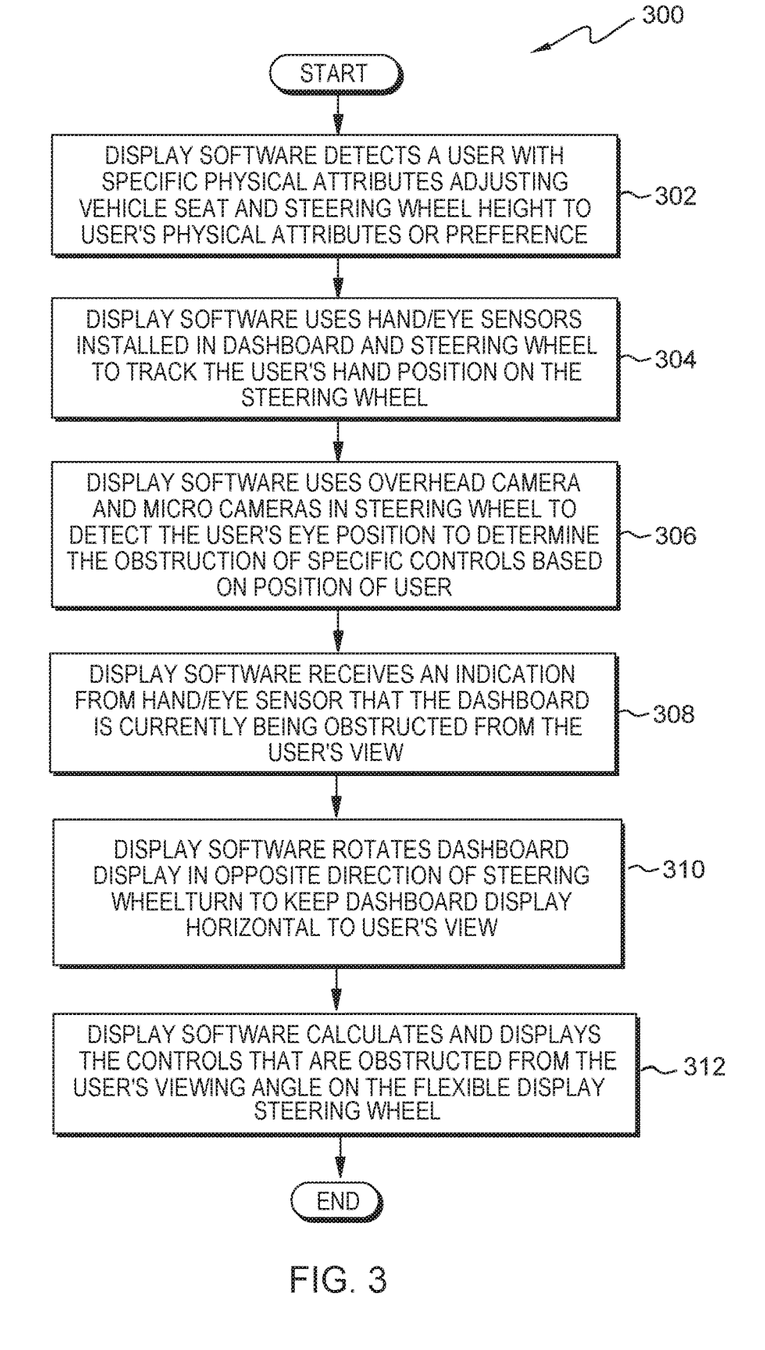
FIG. 3 is a flowchart depicting operational steps of a display software, on a vehicle within the vehicle operating environment of FIG. 1, for displaying obstructed dashboard controls on a flexible display, in an embodiment in accordance with the present invention.

FIG. 3 is a flowchart, generally designated 300, depicting operational steps of a display software, on a vehicle within the vehicle operating environment of FIG. 1, for displaying obstructed dashboard controls on a flexible display, in an embodiment in accordance with the present invention. Flexible display 118 is built-in to steering wheel 116. In other example embodiments, flexible display 118 may be located in one or more locations of vehicle 102. For example, flexible display 118 may be installed at the following locations: (i) in steering wheel 116, (ii) in a dashboard location on the passenger side of vehicle 102, and (iii) behind the driver and passenger front seats. This would allow passengers in vehicle 102 to view trip information, displayed in a trip counter of dashboard 114, to determine an estimated arrival time.

Continuing the example embodiment of FIG. 2, display software 122 detects a user with specific physical attributes adjusting vehicle seat and steering wheel height to user's physical attributes or preference as depicted in step 302. For example, a user with specific physical attributes (e.g., height, weight, leg length, arm length, etc.) sits and adjusts vehicle 102's seat and steering wheel 116 height to his/her preference. In other example embodiments, display software 122 may automatically adjust the vehicle seat and steering wheel height to a user's preference based on a programmable key or a programmable button. The programmable button may be located on dashboard 114, or on flexible display 118.

In step 304, display software uses hand/eye sensors installed in dashboard 114 and steering wheel 116 to track the user's hand position on the steering wheel. For example, as the user turns steering wheel 116, hand/eye sensor 112 installed in dashboard 114 and steering wheel 116 track the users hand position on the steering wheel. In other example embodiments, hand/eye sensor 112 may be configured to monitor the user of vehicle 102 to make sure the driver's attention is focused on the road. For example, a parent may let a son or daughter use vehicle 102. Prior to the son or daughter leaving vehicle 102, the parent may configure display software 122 to monitor limits on hand/eye sensor 112. For example, the son or daughter may receive am audio warning when driving with one hand or if the son or daughter's view is not focused on the road.

Display software 122 uses overhead cameras and micro cameras in steering wheel 116 to detect the user's eye position to determine the obstruction of specific controls based on the position of user as depicted in step 306. For example, display software 122 accesses one or more cameras 110 in dashboard 114 and in steering wheel 116 (not shown) to track the position of the user's eyes to determine where the user's eyes are focused. In other example embodiments, a user of vehicle 102 may use eye tracking glasses (not shown) to relay eye tracking information to display software 122. For example, a user may wear eye tracking glasses (not shown) that are connected wirelessly to display software 122, that track and transmit information relating to the user's eyes to display software 122. When the user's view is fixed on dashboard 114, display software determines if any portions of dashboard 114 are currently blocked by steering wheel 116.

Display software 122 receives an indication from hand/eye sensor that dashboard 114 is currently being obstructed from the user's view as depicted in step 308. For example, the user of vehicle 102 rotates steering wheel 116 and display software 122, using camera 110 and hand/eye sensor 112, determines the user cannot view one or more portions of dashboard 114.

In step 310, display software 122 rotates dashboard display in the opposite direction of steering wheel 116's turn to keep dashboard display horizontal to the driver's view. For example, as the user of vehicle 102 rotates steering wheel 116, display software 122 will render the image of blocked portions of dashboard 114 on steering wheel 116. As steering wheel 116 is rotated, the rendered image of dashboard 114 will rotate on steering wheel 116 in the opposite direction so the rendered image of dashboard 114 remains substantially horizontal (for example, horizontal to the extent that the rendered controls of dashboard 114 remain easily readable by the user). Further, display software 122 may utilize cameras 110 to determine the driver's position, adjusting the displayed portions of dashboard 114 accordingly such that the displayed portions appear horizontal from the driver's position and viewing angle. When this occurs, the displayed portions of dashboard 114 may appear slightly rotated from the view of a passenger in a rear seat with an unobstructed view of both steering wheel 116 and dashboard 114. From the viewpoint of the passenger in the rear seat, the rendered image of dashboard 114 may appear to be slightly off (e.g., by five degrees). In other example embodiments, dashboard 114 may be continuously displayed on steering wheel 116, regardless of the user's hand and/or eye positions.

In step 312, display software 122 calculates and displays the controls that are obstructed from the user's viewing angle on flexible display 118 of steering wheel 116. For example, display software 122 will calculate the blocked instruments, gauges, and controls that are obstructed from the user's current viewing angle and displays the blocked instruments, gauges, and controls on flexible display 118. In other example embodiments, display software 122 monitors the output of an on-board computer (not shown) of vehicle 102 that renders a digital version of dashboard 114. Display software 122 may utilize the information used to render a digital version of dashboard 114 as opposed to information from one or more instances camera 110 to display elements of dashboard 114 that are obscured.

Figure 4:
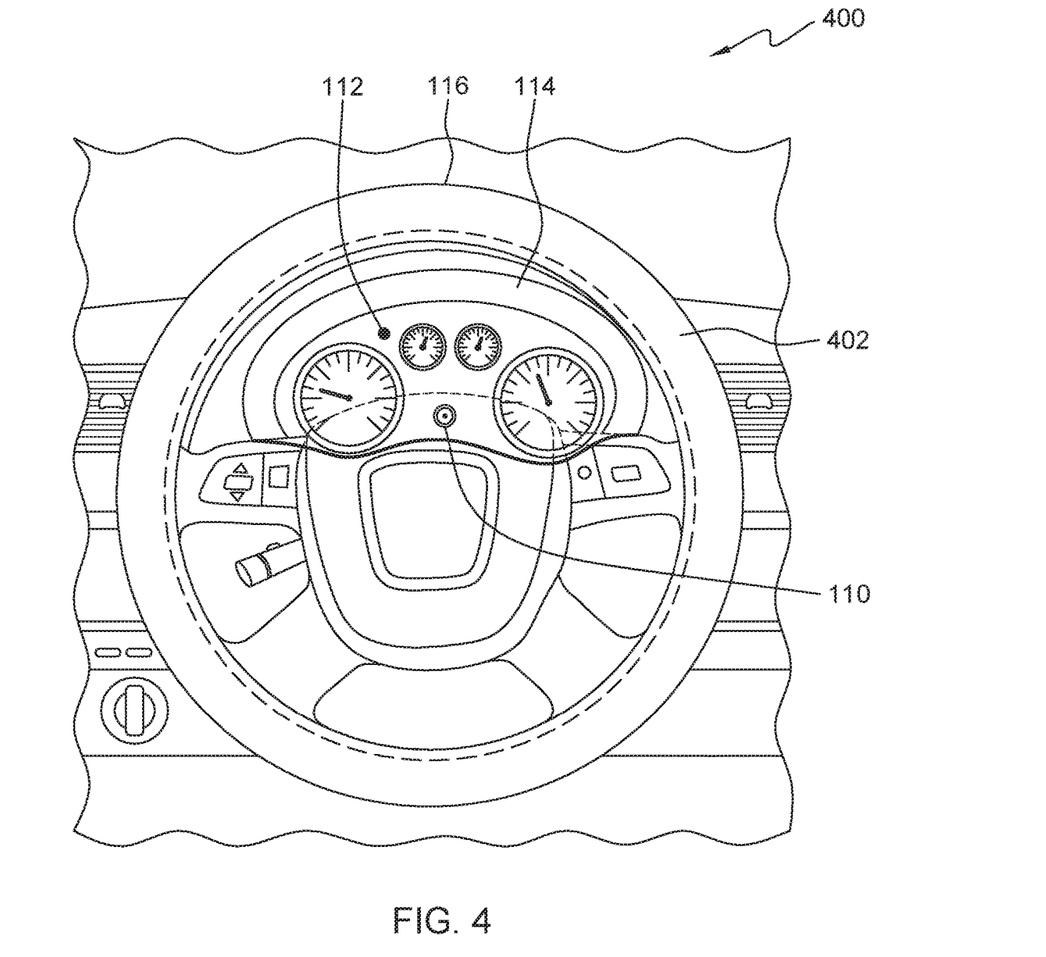
FIG. 4 is a diagram illustrating a display software, on a vehicle within the vehicle operating environment of FIG. 1, for making a portion of the steering wheel transparent to display obstructed dashboard controls, in an embodiment in accordance with the present invention.

FIG. 4 is a diagram, generally designated 400, illustrating a display software, on a vehicle within the vehicle operating environment of FIG. 1, for making a portion of the steering wheel transparent to display obstructed dashboard controls, in an embodiment in accordance with the present invention. In an example embodiment, display software 122 detects an obstruction of a user's view of dashboard 114 and makes steering wheel 116 transparent to allow the user to see one or more dashboard 114 controls. For example, steering wheel 116 is equipped with a built-in transparent display 402. Dashboard 114 also contains hand/eye sensor 112 to track the user's hand position on steering wheel 116 and one or more cameras 110 installed inside steering wheel 116 (i.e., "behind the display" camera technology), so that dashboard 114 may be captured and accordingly steering wheel will be made transparent. In other example embodiments, hand/eye sensor 112 may be installed in steering wheel 116.

Figure 5:
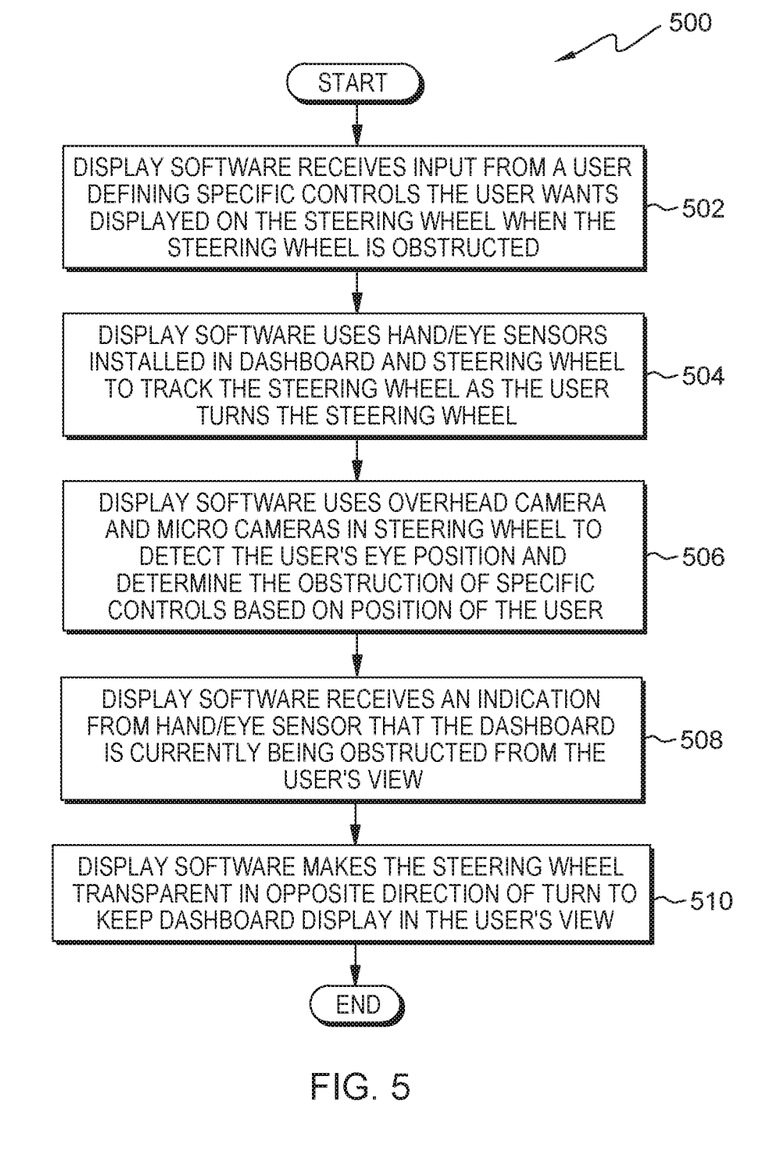
FIG. 5 is a flowchart depicting operational steps of a display software, on a vehicle within the vehicle operating environment of FIG. 1, for making a portion of the steering wheel transparent to display obstructed dashboard controls, in an embodiment in accordance with the present invention.

FIG. 5 is a flowchart, generally designated 500, depicting operational steps of a display software, on a vehicle within the vehicle operating environment of FIG. 1 and depicted in FIG. 4, for making a portion of the steering wheel transparent to display obstructed dashboard controls, in an embodiment in accordance with the present invention. In one example embodiment, display software 122 may track a user's eyes to determine when the user is looking at dashboard 114. Upon determining the user is looking at dashboard 114, display software 122 may automatically make a portion of steering wheel 116 transparent as depicted in FIG. 4, wherein the portion of steering wheel 116 may be obstructing the user's view of dashboard 114. In another example embodiments, a user of vehicle 102 may define specific controls to not be displayed on steering wheel 116 when dashboard 114 is obstructed. In other example embodiments, a user of vehicle 102 may define specific controls that are be displayed on steering wheel 116 when dashboard 114 is obstructed.

Continuing the example embodiment of FIG. 4, display software 122 receives input from a user defining specific controls the user wants displayed on steering wheel 116 when the steering wheel 116 is obstructed as depicted in step 502. For example, the user may only want to see the temperature gauge, speedometer, and fuel gauge displayed when steering wheel 116 is obstructing dashboard 114. In other example embodiments, a user may automatically set one or more specific controls to be displayed upon entering vehicle 102 using radio frequency identification (RFID) tags. One or more RFID tags may be carried by the user attached to a keychain or carried in a purse or wallet.

In step 504, display software 122 uses one or more hand/eye sensors 112 installed in dashboard 114 and steering wheel 116 to track steering wheel 116 as the user turns steering wheel 116. For example, as the user turns steering wheel 116, hand/eye sensor 112 installed in dashboard 114 and/or steering wheel 116 track the user's hand position on the steering wheel. In other example embodiments, hand/eye sensor 112 may be configured to monitor the user of vehicle 102 to make sure the user is fully awake and the user's attention is focused on the road. For example, a user of vehicle 102 may configure display software 122 to monitor a current driver's eye to determine if the driver requires rest. For example, a current driver may receive an audio warning when display software 122 determines a certain level of tiredness.

In step 506, display software 122 uses overhead camera 110 and micro cameras, also referred to as camera 110, in steering wheel 116 to detect the user's eye position to determine the obstruction of specific controls based on position of user. For example, the user may be at a stop light waiting to turn with steering wheel 116 partially rotated causing the user to shift position. Display software activates one or more cameras 110, overhead or in steering wheel 116, to determine the obstruction to the user's focus on dashboard 114.

Display software 122 receives an indication from hand/eye sensor 112 that dashboard 114 is currently being obstructed from the user's view as depicted in step 508. For example, the user of vehicle 102 shifts position by leaning slightly on a center console of vehicle 102 and at the same time, rotates steering wheel 116. Display software 122, using camera 110 and hand/eye sensor 112, determines the user cannot view one or more portions of dashboard 114.

Display software 122 then makes steering wheel 116 transparent in the opposite direction of the turn to keep dashboard display in the users view as depicted in step 510.

For example, as the user moves his/her focus to dashboard 114, the portion of dashboard 114 that is obstructed by steering wheel 116 would become visible as one or more portions of steering wheel 116 become transparent. In other example embodiments, while a user is driving vehicle 102, display software 122 may identify contextual information, such as dashboard information (e.g., an engine warning light), that may be shown in the steering wheel display. A contextual button can also be shown on steering wheel 116 near the user's hand position. Display software 122 will identify the driver's hand position and accordingly an appropriate menu will be displayed in steering wheel near the driver's hand position.

Figure 6:
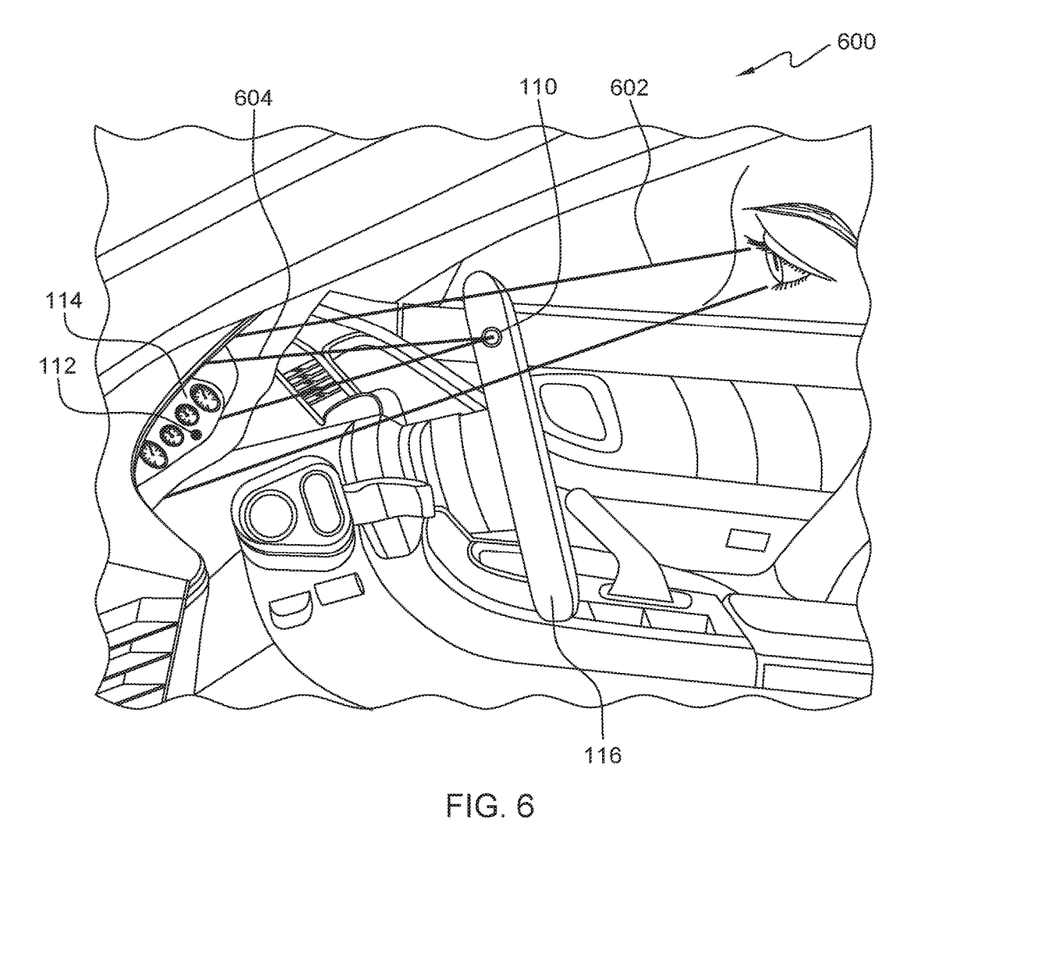
FIG. 6 is a diagram illustrating a "behind the display" camera technology, on a vehicle within the vehicle operating environment of FIG. 1, to capture the obstructed dashboard controls, in an embodiment in accordance with the present invention.

FIG. 6 is a diagram, generally designated 600, illustrating a "behind the display" camera technology, on a vehicle within the vehicle operating environment of FIG. 1, to capture the obstructed dashboard controls, in an embodiment in accordance with the present invention. In an example embodiment, one or more cameras 110 are installed in steering wheel 116 to create a "behind the display" camera technology that makes steering wheel 116 transparent to a user of vehicle 102. For example, one or more cameras 110 installed behind flexible display 118 will capture one or more photographs of dashboard 114, as depicted by reference 604, and then display the captured one or more photographs on the viewable side of steering wheel 116 on flexible display 118 to allow the driver to view dashboard 114 as depicted by reference 602. In other example embodiments, display software 122 may use one or more hand/eye sensor 112 to track a user's hands and/or eyes when determining an obstruction of dashboard 114.

Figure 7:
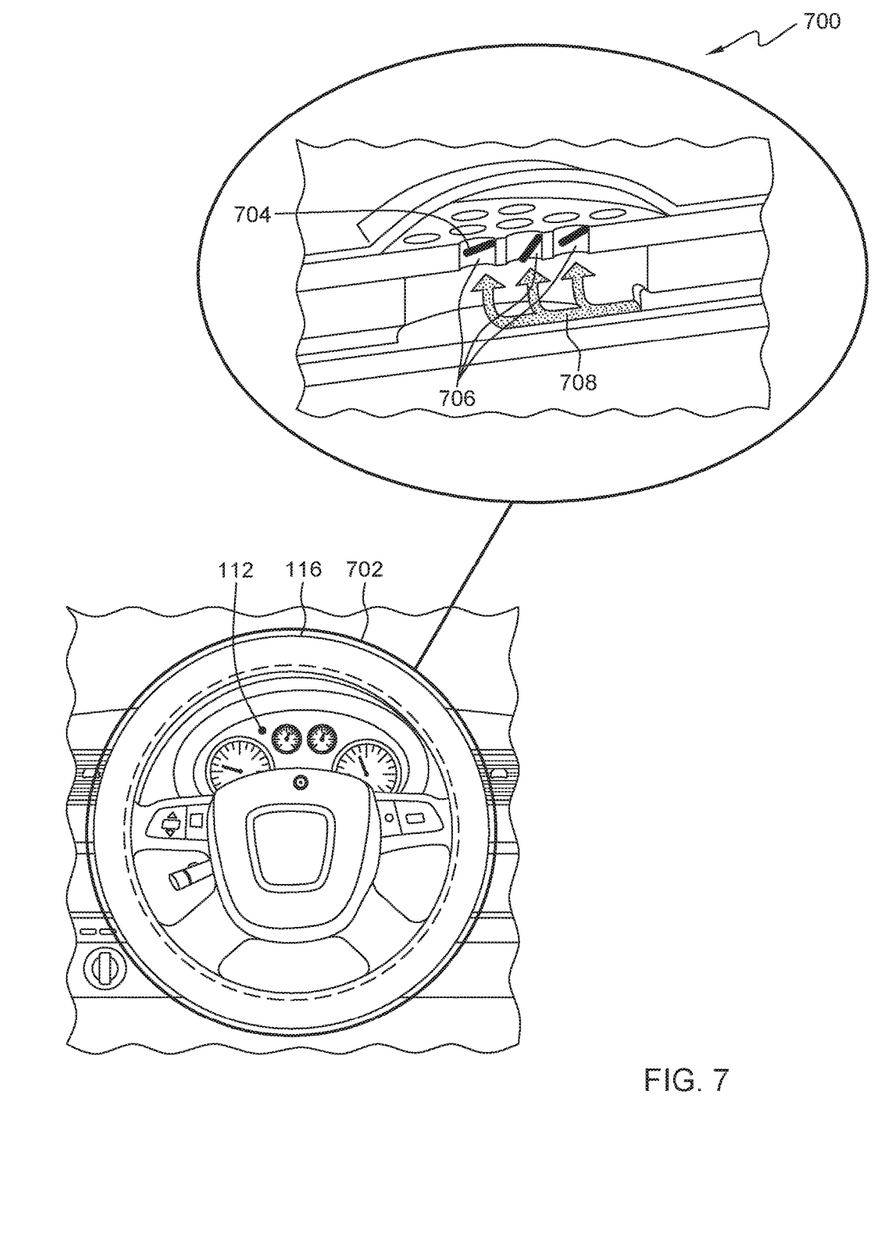
FIG. 7 is a diagram illustrating a microfluidics touch layer steering wheel, on a vehicle within the vehicle operating environment of FIG. 1, for providing touch sensations and haptic feedback, in an embodiment in accordance with the present invention.

FIG. 7 is a diagram, generally designated 700, illustrating a microfluidics touch layer steering wheel, on a vehicle within the vehicle operating environment of FIG. 1, for providing touch sensations and haptic feedback, in an embodiment in accordance with the present invention. In an example embodiment, steering wheel 116 includes a transparent microfluidics layer 702 providing haptic feedback in the form of a touch sensation on steering wheel 116 of vehicle 102, wherein a user of vehicle 102 may customize and/or map one or more haptic feedback for one or more conditions. For example, a user may customize transparent microfluidics layer 702 to have a leather feel, and/or generate a quick pulse when possible icy conditions are detected on a road. In other example embodiment, display software 122 may configured trigger a two rapid pulses when hand/eye sensor 112 detects that the driver's hands are not at the 10:00 and 2:00 positions on steering wheel 116.

Transparent microfluidics layer 702 allows the user of vehicle 102 to adjust a preferred hardness or a preferred softness of the portion of steering wheel 116 that the user's hands would touch. This allows the user to have a variety of different touch sensations, such as the feeling of leather, for steering wheel 116. For example, display software 122 may be configured to provide haptic feedback for, but not limited to, the following conditions: (i) an indication of one or more road conditions (e.g., a bumpy road may trigger a pulsing response), (ii) an indication of one or more weather conditions (e.g., an icy road may trigger a quick burst), (iii) an indication of a driver focus (e.g., a driver not paying attention to the road), and (iv) an indication of a driver alertness. For example, display software 122 may trigger a rapid pulsing response when detecting a certain level of alertness of a user of vehicle 102 (e.g., falling asleep). In other example embodiments, display software 122 may configured trigger a rapid pulsing response when display software 122 receives an indication for a special weather alert, or weather conditions.

Transparent microfluidics layer 702 is comprised of a microfluidics panel that contains one or more valves (reference 704) installed in one or more micro fluid ports (reference 706) that allow micro fluid 708 to expand transparent microfluidics layer 702. Transparent microfluidics layer 702 enables flexible display 118 to have raised or 3D image such that visually impaired user can touch and navigate the image. When valve 704 is closed, or more restrictive, transparent microfluidics layer 702 will have less pressure, thus less height. When valve 704 is opened, or less restrictive, transparent microfluidics layer 702 will have more pressure, thus more height. For example, while displaying one or more gauges and/or controls of dashboard 114 on flexible display 118, display software 122 receives an indication that vehicle 102 is low on fuel. Display software 122 may then generate one or more pulses on transparent microfluidics layer 702 to alert the driver. In another example embodiment, display software 122 may change the feel of steering wheel 116 for a plurality of drivers based on an RFID tag that identifies the driver. Display software 122 may identify the RFID tag and then adjust transparent microfluidics layer 702 to simulate a feeling of leather when the driver touches steering wheel 116. In other example embodiments, display software 122 may display the video of a "back-up," or rear facing camera (e.g., camera 110), on flexible display 118 when a driver of vehicle 102 is backing up. Display software 122 may provide haptic responses to the driver when vehicle 102 approaches, or comes within, a defined distance of another object. For example, when vehicle 102 is 10 feet from the object, display software 122 may generate a single pulse using transparent microfluidics layer 702 to inform the driver of the object. When vehicle 102 is 5 feet from the object, display software 122 may generate several rapid pulses using transparent microfluidics layer 702 to inform the driver of the object.

FIG. 8 depicts a block diagram, generally designated 800, of components of the vehicle executing the display software, in an embodiment in accordance with the present invention. FIG. 8 depicts a block diagram of components of vehicle 102 in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

Vehicle 102 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer readable storage media. In this embodiment, memory 806 includes random access memory (RAM) 814 and cache memory 816. In general, memory 806 can include any suitable volatile or non-volatile computer readable storage media.

Operating system 120 and display software 122 are stored in persistent storage 808 for execution by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices, including resources of network 124 and server 126. In these examples, communications unit 810 includes one or more network interface cards. Communications unit 810 may provide communications through the use of either or both physical and wireless communications links. Operating system 120 and display software 122 may be downloaded to persistent storage 808 through communications unit 810.

I/O interface(s) 812 allows for input and output of data with other devices that may be connected to vehicle 102. For example, I/O interface 812 may provide a connection to external devices 818 such as a keyboard, keypad, a touch screen, such as a portion of steering wheel 116, and/or some other suitable input device. In another example, I/O interface may control transparent microfluidics layer 702 of steering wheel 116. External devices 818 can also include portable computer readable storage media such as, for example, thumb drives, portable optical or magnetic disks, and memory cards. Software and data used to practice embodiments of the present invention, e.g., operating system 120 and display software 122, can be stored on such portable computer readable storage media and can be loaded onto persistent storage 808 via I/O interface(s) 812. I/O interface(s) 812 also connect to a display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

DEFINITIONS

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "Includes, but is not necessarily limited to."

A "user" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" acting as a single "user."

The terms "receive," "provide," "send," "input," and "output," should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Automatically" means "without any human intervention."

A "control" is any item (digital or analog) capable of being included in or attached to a vehicle dashboard including, but not necessarily limited to: instruments, gauges, tell-tales, indicators, and/or user-engageable controls.

What is claimed is:

1. A system comprising:
 a vehicle steering wheel having spokes connected to a steering shaft, the wheel positioned in front of a dashboard having controls mounted therein;
 a flexible display attached to the wheel or a spoke;
 a sensor installed in the wheel to detect a driver's hand position on the wheel;
 a transparent microfluidics layer for providing haptic feedback on the wheel;
 an overhead camera and micro cameras installed in the wheel to determine the driver's eye position; and
 a processor attached to the flexible display, the sensor, the microfluidics layer, and the cameras to determine which controls are obscured by the wheel and the spokes for displaying pre-specified ones of the obscured controls on the flexible display, and for providing haptic feedback in the form of a touch sensation on the wheel.

2. The system of claim 1, wherein the wheel is transparent and the flexible display includes a transparency feature to allow the driver to view pre-specified ones of the obscured controls on the dashboard through the flexible display.

3. The system of claim 1, wherein the flexible display is wrapped around the steering shaft.

4. The system of claim 1, wherein the haptic feedback provided by the transparent microfluidics layer is customizable by the driver, allowing the driver to adjust the touch sensation to a preferred level of hardness or a preferred level of softness.

5. The system of claim 1, wherein haptic feedback includes at least one of the following:
   an indication of one or more road conditions,
   an indication of one or more weather conditions,
   an indication of a driver focus, and
   an indication of a driver alertness.

6. The system of claim 1, wherein displaying the pre-specified ones of the obscured controls on the flexible display comprises rotating the displayed pre-specified ones of the obscured controls in an opposite direction of the rotating steering wheel to keep the pre-specified ones of the obscured controls substantially horizontal to the driver's view.

7. A computer-implemented method comprising:
   detecting a driver's hand position on a vehicle steering wheel, the steering wheel positioned in front of a dashboard having controls mounted therein, the steering wheel including a transparent microfluidics layer on a flexible display attached to the steering wheel, for providing haptic feedback on the steering wheel;
   determining the driver's eye position using one or more cameras;
   determining an obstructed dashboard control, wherein a view of the obstructed dashboard control to the driver is obstructed, based, at least in part, on the driver's hand position and the driver's eye position;
   displaying the obstructed dashboard control on the flexible display attached to the steering wheel; and
   providing haptic feedback in the form of a touch sensation on the wheel.

8. The computer-implemented method of claim 7, wherein detecting the driver's hand position comprises using a sensor installed in the steering wheel.

9. The computer-implemented method of claim 7, wherein detecting the driver's eye position using one or more cameras comprises using one or more overhead cameras and one or more micro cameras installed in the steering wheel.

10. The computer-implemented method of claim 7, wherein the haptic feedback includes at least one of the following:
   an indication of one or more road conditions,
   an indication of one or more weather conditions,
   an indication of a driver focus, and
   an indication of a driver alertness.

11. The computer-implemented method of claim 7, wherein the haptic feedback provided by the transparent microfluidics layer is customizable by the driver, allowing the driver to adjust the touch sensation to a preferred level of hardness or a preferred level of softness.

12. The computer-implemented method of claim 7, wherein the wheel is transparent and the flexible display includes a transparency feature to allow the driver to view the obstructed dashboard control on the dashboard through the flexible display.

13. A computer program product comprising:
   one or more computer readable storage media and program instructions stored on the one or more computer readable storage media, the program instructions comprising:
   program instructions to detect a driver's hand position on a vehicle steering wheel, the steering wheel positioned in front of a dashboard having controls mounted therein, wherein the steering wheel includes a transparent microfluidics layer on a flexible display attached to the steering wheel, for providing haptic feedback on the steering wheel;
   program instructions to determine the driver's eye position using one or more cameras;
   program instructions to determine an obstructed dashboard control, wherein a view of the obstructed dashboard control to the driver is obstructed, based, at least in part, on the driver's hand position and the driver's eye position;
   program instructions to display the obstructed dashboard control on the flexible display attached to the steering wheel; and
   program instructions to providing haptic feedback in the form of a touch sensation on the steering wheel.

14. The computer program product of claim 13, wherein detecting the driver's hand position comprises using a sensor installed in the steering wheel.

15. The computer program product of claim 13, wherein detecting the driver's eye position using one or more cameras comprises using one or more overhead cameras and one or more micro cameras installed in the steering wheel.

16. The computer program product of claim 13, wherein the haptic feedback includes at least one of the following:
   an indication of one or more road conditions,
   an indication of one or more weather conditions,
   an indication of a driver focus, and
   an indication of a driver alertness.

17. The computer program product of claim 13, wherein the haptic feedback provided by the transparent microfluidics layer is customizable by the driver, allowing the driver to adjust the touch sensation to a preferred level of hardness or a preferred level of softness.

* * * * *